(12) United States Patent
Nakamura (10) Patent No.: US 7,965,601 B2
(45) Date of Patent: Jun. 21, 2011

(54) DISK RECORDING/REPRODUCING APPARATUS AND DISK RECORDING METHOD

(75) Inventor: Masaru Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 766 days.

(21) Appl. No.: 11/666,999

(22) PCT Filed: Nov. 1, 2005

(86) PCT No.: PCT/JP2005/020087
§ 371 (c)(1),
(2), (4) Date: May 2, 2007

(87) PCT Pub. No.: WO2006/049155
PCT Pub. Date: May 11, 2006

(65) Prior Publication Data
US 2008/0037391 A1  Feb. 14, 2008

(30) Foreign Application Priority Data

Nov. 5, 2004 (JP) ................................ 2004-321800

(51) Int. Cl.
*G11B 7/00* (2006.01)
(52) U.S. Cl. ................ 369/53.35; 369/47.11; 369/47.14
(58) Field of Classification Search ............... 369/53.25, 369/275.3, 44.32, 53.12, 53.13, 53.14, 47.11, 369/53.35, 47.14, 47.18, 47.21, 47.22, 53.15, 369/53.42
See application file for complete search history.

(56) References Cited

U.S. PATENT DOCUMENTS 6,975,573 B2   12/2005   Yamamoto
(Continued)

FOREIGN PATENT DOCUMENTS

JP    3-116537 A    5/1991
(Continued)

OTHER PUBLICATIONS

International Search Report dated Dec. 6, 2005 from the corresponding International Patent Application No. PCT/JP2005/020087.
(Continued)

*Primary Examiner* — Nabil Z Hindi
(74) *Attorney, Agent, or Firm* — Katten Muchin Rosenman LLP (57) ABSTRACT

To provide an optical disk recording/reproducing apparatus capable of immediately suspending recording if a recording inadequate state occurs after start of recording, confirming the recording state by using an error-correction-code word unit and restarting recording after identifying the write continuation position. A recording starting section (1) instructs a recording gate/recording data creating section (5) to create a recording gate corresponding to a desired volume of data and recording data and to perform recording. If an inadequate-recording-state determining section (2) detects a recording inadequate state, a recording suspending section (3) instructs the recording gate/recording data creating section (5) to suspend outputting the recording gate and the recording data. A SYNC detection section (9) detects a SYNC signal from reproduced data, and a PO-error-correction processing section (11) performs PI-error-correction. A recording-suspended-position determining section (13) determines to what extent the recording has been performed. Depending on the result, a recording restart section (4) issues an instruction to restart recording, and the recording gate/recording data creating section (5) creates again the recording gate and recording data and restarts the recording.

24 Claims, 4 Drawing Sheets

U.S. PATENT DOCUMENTS

| | | | |
|---|---|---|---|
| 7,046,610 B2 * | 5/2006 | Sakagami et al. | 369/59.25 |
| 7,221,641 B2 * | 5/2007 | Noda et al. | 369/275.3 |
| 2003/0048720 A1 | 3/2003 | Yamamoto | |
| 2003/0169657 A1 | 9/2003 | Ishitobi et al. | |

FOREIGN PATENT DOCUMENTS

| | | |
|---|---|---|
| JP | 4-195867 | 7/1992 |
| JP | 6-124548 | 5/1994 |
| JP | 2003-85883 | 3/2003 |
| JP | 2003-85883 A | 3/2003 |
| JP | 2003-109226 A | 4/2003 |
| JP | 2003-308654 | 10/2003 |
| JP | 2005-259280 A | 9/2005 |

OTHER PUBLICATIONS

Japanese Office Action issued on Jun. 30, 2008, from the corresponding Japanese Application.

Japanese Office Action issued on Sep. 18, 2008, from the corresponding Japanese Application.

* cited by examiner

DISK RECORDING/REPRODUCING APPARATUS AND DISK RECORDING METHOD

This application is a National Phase Application of International Application No. PCT/JP2005/020087, filed Nov. 1, 2005, which claims the benefit under 35 U.S.C. 119 (a-d) of Japanese Patent Application No. JP 2004-321800 filed Nov. 5, 2004, which is herein incorporated by reference.

TECHNICAL FIELD

The present invention relates to a disk recording/reproducing apparatus and a disk recording method and, more particularly, to a disk recording/reproducing apparatus and a disk recording method for optically recording data on a disk medium.

BACKGROUND ART

In recent years, disk recording/reproducing apparatuses for optically recording/reproducing data are generally used in a wide variety of areas. The disk recording/reproducing apparatuses irradiate a laser light onto a recording surface of an optical disk medium such as a CD or DVD to read recorded data for reproduction or to optically record data. Disk media through which data are read and written by the disk recording/reproducing apparatuses include a CD-R, CD-RW, DVD-R, DVD-RW and the like.

There may occur a state in which recording is inadequately continued such as, for example, a state in which a servo tracking failure is made on a disk medium, a state in which a failure of a PLL for creating a recording clock or a state in which data is not provided in time for recording due to a higher recording speed on the disk medium than encoding speed of recording data. If recording is continued for the case in which such a state occurs, data cannot be recorded in a proper position where the data is to be recorded, or adequate object data cannot be correctly recorded.

If there occurs a state in which continued recording is inadequate, it is desirable to suspend the recording and then to start recording again. In this case, when the disk recording/reproducing apparatus uses a rewritable disk such as a CD-RW or DVD-RW, for which data can be overwritten without restriction, the data can be recorded again from the beginning. However, if the disk medium is a write-once disk such as CD-R or DVD-R, which allows data to be written only once, no overwrite is permitted. Thus, if storage of data is conducted again from the beginning, the disk medium cannot be reproduced therefrom.

In recent years, a larger number of write-once disks which are cheaper than rewritable disks have been used. However, cheap a disk medium may be, if a recording inadequate state occurs, it is not proper to determine the failed recording disk as a non-reproducible disk. On the contrary, if the recording has been suspended, it is desired to additionally record data from the recording-suspended position, in order to enable the data to be reproduced normally, if it is possible.

In order to add data to a disk medium, it is necessary to check in which position of the disk medium data is written and to identify a recording-suspended position. As a method for identifying the recording-suspended position of a writing-suspended optical disk medium, there is a technology described in Patent Publication JP-2003-308654A. In this technology, a syndrome calculation is performed using a transverse correction-code PI-parity to obtain the recording-suspended position, by determining whether the result of calculation includes an error, i.e., other than "0", or no error, i.e., "0".

DISCLOSURE OF THE INVENTION

Problems to be Solved by the Invention

In read data, there may occur an error due to a variety of causes, such as a dirty disk, adhered dust, deviation of tracking or focusing point during the reproduction, or a tilt of disk. In consideration of such causes of the error, it is highly possible to detect a wrong recording-suspended position if the recording-suspended position is identified only based on the presence or absence of an error, as in the technology of JP-2003-308654A. In such a case, there may occur a problem in that a duplicate writing is performed in the write-once disk, to thereby to make the disk as a non-reproducible disk.

It is an object of the present invention to provide a disk recording/reproducing apparatus and a disk recording method, capable of eliminating the above problem of the conventional technique and of correctly detecting the recording-suspended position of a writing-suspended disk medium.

Means for Solving the Problems

In order to attain the above object, according to a first aspect of the present invention, there is provided a disk recording/reproducing apparatus which includes a data recording section for recording data on a disk medium and a data reproducing section for reproducing data from the disk medium, the apparatus including:

recording suspending means for monitoring whether or not a recording inadequate state occurs, to suspend recording by the data recording section if the recording inadequate state occurs;

reproducing instructing means for instructing the data reproducing section to reproduce data from a disk medium on which the recording is suspended;

suspended-position estimating means for estimating a recording-suspended position by examining whether or not an inner-code-error-correction is possible for data reproduced from the recording-suspended disk medium by the data reproducing section; and recording restart means for restarting recording by the data recording section from a recording restart position determined based on the estimated recording-suspended position.

According to a second aspect of the present invention, there is provided a disk recording method using a disk recording/reproducing apparatus which includes a data recording section for recording data on a disk medium and a data reproducing section for reproducing data from the disk medium, the method including the steps of:

monitoring whether or not a recording inadequate state occurs, to suspend recording by the data recording section if the recording inadequate state occurs;

instructing the data reproducing section to reproduce data from a disk medium on which the recording is suspended;

estimating a recording-suspended position by examining whether or not an inner-code-error-correction is determined possible for the reproduced data based on the reproduced data reproduced by the data reproducing section; and restarting recording by the data recording section from a recording restart position determined based on the estimated recording-suspended position.

In the disk recording/reproducing apparatus and the disk recording method according to the first and second aspects, a recording-suspended disk medium is reproduced and a recording-suspended position on the disk medium is estimated based on result of correction by the inner code added to the recording data. Thus, the recording-suspended position can be correctly estimated if any error is included in the reproduced data.

If at least one of a tracking failure in servo tracking, a synchronization failure in a recording-clock generating PLL and a delay of recording data supplied to the data recording section occurs, the recording suspending means can employ a configuration for suspending the recording by the data recording section. If a tracking failure in serve tracking, a synchronization failure in a recording-clock generating PLL or a delayed recording data supplied to the data recording section occurs, correct data cannot be recorded in a correct position even if the recording is continued without change. In such a case, recording can be continued by temporarily suspending the recording to release the error, to thereby restart the recording again.

The suspended-position estimating means can employ a configuration including an error-correction-result determining means for estimating that the recording-suspended position is present in the recording block of an inner-code-error-correction-code word unit for which the inner-code-error correction is determined impossible. In a recording block where data is recorded only partway, the error correction for the data is considered impossible by using the inner-code-error-correction. Thus, if the inner-code-error-correction is determined impossible, the recording-suspended position is estimated to be present in the recording block of the inner-code-error-correction-code word unit for which the error correction is impossible.

The recording restart means can employ the configuration of determining the recording restart position at the start of the recording block of the inner-code-error-correction-code word unit for which the error correction is determined impossible by the error-correction-result determining means. Alternatively, the recording restart means can employ the configuration of determining the recording restart position at the start of a recording block succeeding to the recording block of the inner-code-error-correction-code word unit for which the error correction is determined impossible by the error-correction-result determining means. Recording is restarted at the start of the recording block including the recording-suspended position or at the start of a recording block succeeding to the recording block, thereby facilitating control. In this case, some overwrite or non-recorded state occurs, which is at most one inner-code-error-correction-code word unit, being substantially out of the question during reproducing a disk medium.

The recording restart means can employ the configuration of determining the recording restart position in a predetermined position in the recording block of the inner-code-error-correction-code word unit for which the error correction is determined impossible by the error-correction-result determining means. In this case, if the predetermined position is set to the center of the recording block, the occurrence of overwriting or non-recorded state can be suppressed to a half the inner-code-error-correction-code word unit.

Preferably, the suspended-position estimating means further includes a reproduction-data-rule-violation detection means for determining whether or not the reproduced data violates a predetermined reproduction data rule to detect a code position violating the reproduction data rule and estimates the recording-suspended position based on the code position violating the reproduction data rule in addition to determining whether or not the inner-code-error correction is possible. The data recorded on a disk medium is subject to a rule so that, for example, more than a predetermined number of '0' or '1' may not continue. Thus, depending on whether or not the reproduced data violates the rule, a recording-suspended position can be estimated. Further, based on both the inner-code-error-correction result and the reproduction data rule, the recording-suspended position is estimated, whereby the recording-suspended position is estimated more correctly.

The recording restart means may preferably stop the restarted recording temporarily at the end of the ECC block including the estimated recording-suspended position to determine whether or not the error correction for the reproduced data is possible by reproducing the ECC block. If it is determined that the error correction is possible, the recording is preferably restarted in an ECC block succeeding to the ECC block including the estimated recording-suspended position. In this case, if the error correction for the ECC block including the recording-suspended position is possible and the ECC block can be reproduced correctly by correcting the error, the recording of the subsequent ECC blocks is continued. Moreover, if the error correction of the ECC block is determined impossible, recording is stopped thereby to enable a situation to be avoided in which the recording-restarted ECC block is proved impossible for reproduction after recording has been performed up to the final recording position.

According to a third aspect of the present invention, there is provided a disk recording/reproducing apparatus which includes a data recording section for recording data on a disk medium and a data reproducing section for reproducing data from the disk medium, the apparatus including:

recording suspending means for monitoring whether or not a recording inadequate state occurs, to suspend recording by the data recording section if the recording inadequate state occurs;

reproducing instructing means for instructing the data reproducing section to reproduce data from a recording-suspended disk medium;

suspended-position estimating means for estimating a recording-suspended position by examining whether or not data reproduced from the recording-suspended disk medium by the data reproducing means violates a predetermined reproduction data rule; and recording restart means for restarting the recording by the data recording section from a recording restart position determined based on the estimated recording-suspended position.

According to a fourth aspect of the present invention, there is provided a disk recording method in a disk recording/reproducing apparatus which includes a data recording section for recording data on a disk medium and a data reproducing section for reproducing data from the disk medium, the method including the steps of:

monitoring whether or not a recording inadequate state occurs, to suspend recording by the data recording section if the recording inadequate state occurs;

creating reproduced data by reproducing data from a disk medium on which the recording is suspended;

estimating a recording-suspended position by examining whether or not the reproducing data violates a predetermined reproduction data rule; and restarting the recording from a recording restart position determined based on the estimated recording-suspended position.

In the disk recording method and the disk recording/reproducing apparatus according to the third and fourth aspects of the present invention, after suspending the recording, the recorded data is reproduced, and the recording-suspended position is estimated by examining whether or not the reproduced data violates a predetermined reproduction data rule. For estimating the recording-suspended position based on the violation of the reproduction data rule, the recording-suspended position can be estimated bit by bit, thereby enabling the recording-suspended position to be estimated more accurately.

According to a fifth aspect of the present invention, there is provided a disk recording/reproducing apparatus which includes a data recording section for recording data on a disk medium and a data reproducing section for reproducing data from the disk medium, the apparatus including:

recording suspending means, reproducing instructing means, recording-suspended-position estimating means, error-correction-result determining means and recording restart means, characterized in that:

the recording suspending means monitors whether or not a recording inadequate state occurs, to suspend recording by the data recording section if the recording inadequate state occurs;

the reproducing instructing means instructs the data reproducing section to reproduce data from a disk medium on which the recording is suspended;

the suspended-position estimating means estimates a recording-suspended position based on data reproduced from the recording-suspended disk medium by the data recording section;

the recording restart means restarts recording by the data recording section and instructs the data recording section to record data from the recording restart position determined based on the estimated recording-suspended position to an end of an error-correction-code (ECC) block including the estimated recording-suspended position;

the reproducing instructing means instructs the data reproducing section to reproduce the ECC block recorded by the data recording section according to the instruction of the recording restart section;

the error-correction-result determining means determines whether or not an error correction for the data reproduced by the data reproducing section is possible; and the recording restart means instructs the data recording section to restart recording of an ECC block succeeding to the ECC block including the estimated recording-suspended position if the error correction is determined possible by the error-correction-result determining means.

According to a sixth aspect of the present invention, there is provided a disk recording method in a disk recording/reproducing apparatus which includes a data recording section for recording data on a disk medium and a data reproducing section for reproducing data from the disk medium, the method including the steps of:

monitoring whether or not a recording inadequate state occurs, to suspend recording if the recording inadequate state occurs;

reproducing data from the disk medium on which recording has been suspended by the step of suspending data recording;

estimating a recording-suspended position based on data reproduced from the recording-suspended disk medium;

recording data from a recording restart position determined based on the estimated recording-suspended position to an end of an ECC block including the estimated recording-suspended position;

reproducing the ECC block including the estimated recording-suspended position;

determining whether or not an error correction for the reproduced data reproduced from the ECC block including the estimated recording-suspended position is possible; and restarting recording from a ECC block succeeding to the ECC block including the estimated recording-suspended position if the error correction is determined possible in the determining step.

In the disk recording method and the disk recording/reproducing apparatus according to the fourth and fifth aspects of the present invention, data is recorded from the recording restart position determined based on the estimated recording-suspended position to the end of the ECC block including the estimated recording-suspended position, and the relevant ECC block is reproduced to correct the error of the reproduced data. If the error correction is determined possible in the error correction process, that is, if the relevant ECC block is determined reproducible, recording of the ECC blocks succeeding to the relevant ECC block is restarted. As described above, after having confirmed that the ECC block including the recording-suspended position is reproducible, the recording of the subsequent ECC blocks is performed, thereby enabling an undesirable situation to be avoided in which the recording-restarted ECC block is proved non-reproducible after the recording has been performed up to the final recording position.

The recording restart means can employ the configuration of stopping recording if the ECC block correction determining means determines that the error correction is impossible.

BEST MODE FOR CARRYING OUT THE INVENTION

Figure 1:
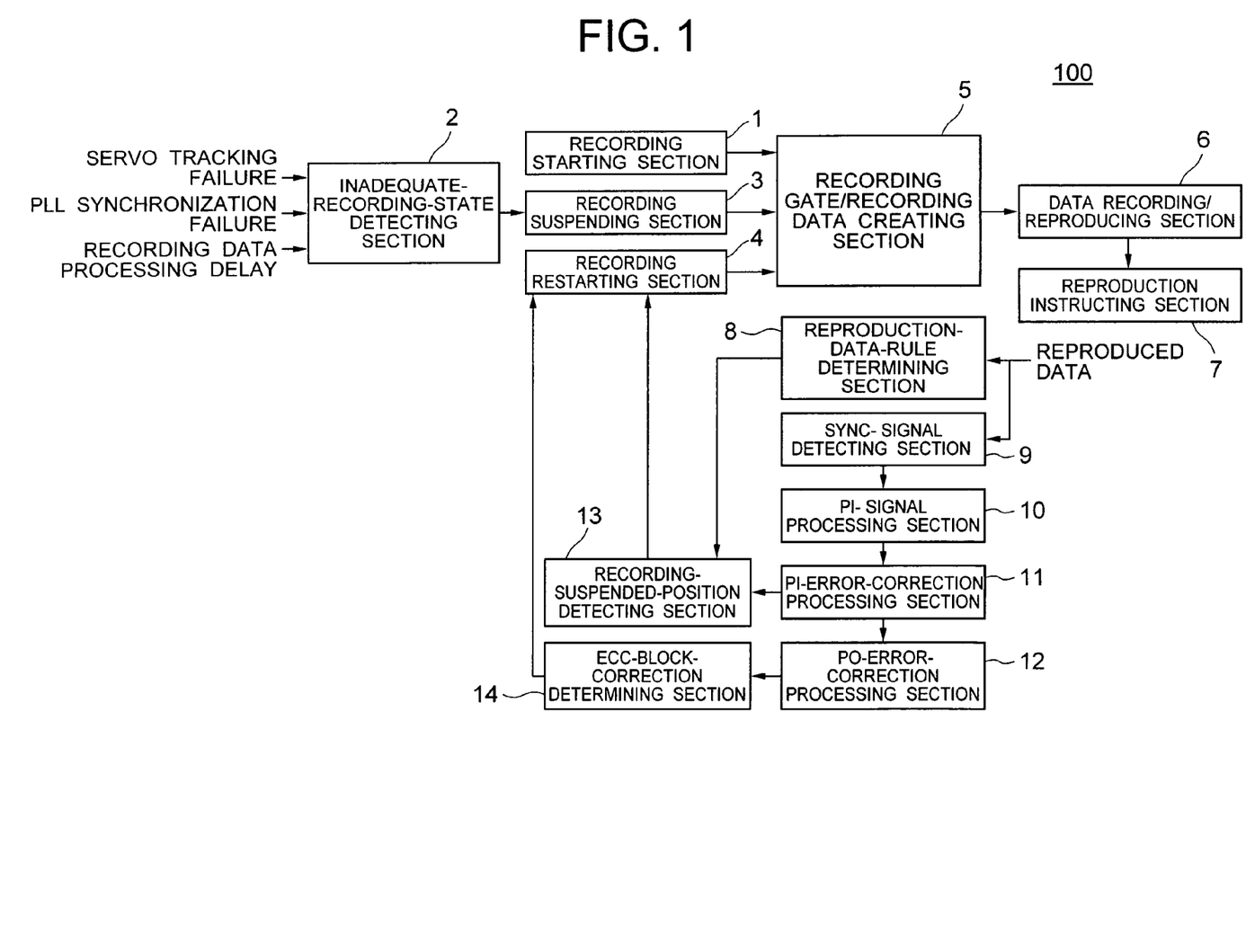
FIG. 1 is a functional block diagram showing the configuration of a disk recording/reproducing apparatus according to an embodiment of the present invention.

Now, the present invention will be described in greater detail by referring to the accompanying drawings. FIG. 1 is a functional block diagram showing the configuration of a disk recording/reproducing apparatus according to an embodiment of the present invention. The disk recording/reproducing apparatus 100 includes a recording starting section 1; a recording-inadequate-state detecting section 2; a recording suspending section 3; a recording restart section 4; a recording gate/recording data creation section 5; a data recording/reproducing section 6; a reproduction instructing section 7; a reproduction-data-rule determining section 8; a SYNC detecting section 9; a PI-code processing section 10; a PI-error-correction processing section 11; a PO-error-correction processing section 12; a recording-suspended-position detecting section 13; and an ECC-block-correction determining section 14. Hereinafter, a case in which a DVD-R is used as a write-once disk will be described; however, other-type write-once disks may be used.

Figure 2:
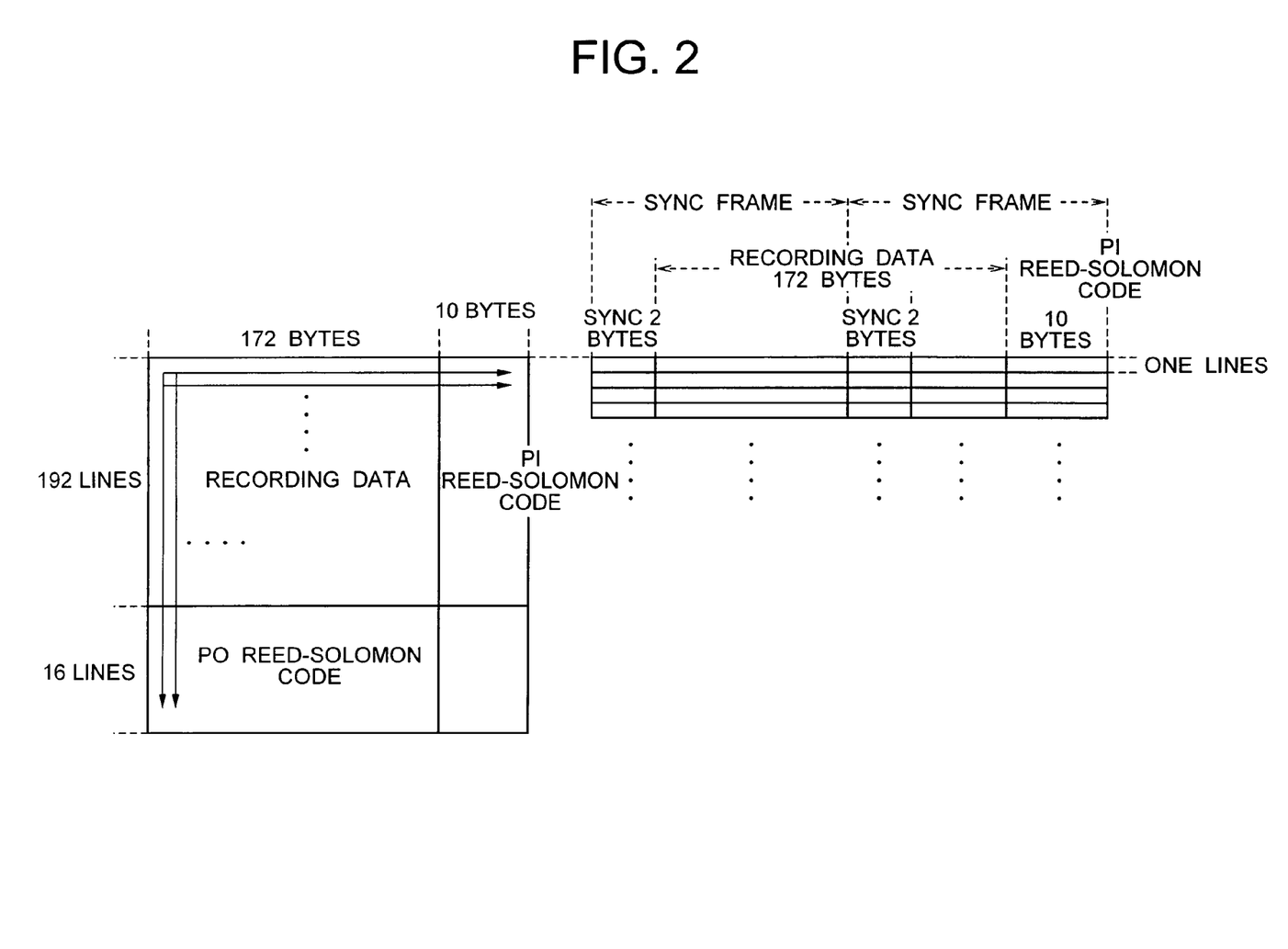
FIG. 2 is a block diagram showing the configuration of an ECC block in a DVD.

The recording starting section 1 instructs to start recording data on a disk medium. The recording gate/recording data creating section 5 creates recording gates and recording data having a predetermined data volume to be recorded on the disk medium based on the instruction from the recording starting section 1 and outputs these data to the data recording/data reproducing section 6. The reproduction instructing section 7 monitors signals input into the data recording/reproducing section 6 and responds to signals from outside to instruct the data recording/reproducing apparatus 6 to reproduce data if needed. FIG. 2 shows a recording format of a DVD. As shown in the figure, the recording data (user data) is partitioned by 172 bytes, and a 10-byte PI Reed-Solomon code is added transversely to each 172-byte user data to configure one-line recording data. A 16-line PO Reed-Solomon code is added longitudinally to 192-line recording data. This 208-line recording data configures an ECC block in a unit. By adding Reed-Solomon codes longitudinally and transversely, an error of up to five bytes can be corrected in a transverse PI-error-correction and an error of up to 16 bytes in a longitudinal PO-error-correction. Such a product code to which Reed-Solomon codes are added longitudinally and transversely can correct errors effectively and is used widely in digital recording equipment. The disk recording/reproducing apparatus 100 divides one-line recording data of 182 bytes in two sections, and records data by a SYNC frame to which a two-byte SYNC signal is added for each of divided recording data.

In recording data on a disk medium, there may occur a recording inadequate state in which recording is inadequately continued without a change. If this state occurs, data cannot be recorded in a proper position to be recorded or is recorded in an improper position by continuing recording without change. This means that correct data cannot be recorded in a proper position to be recorded. Recording inadequate states include a servo tracking error in which servo tracking does not follow the recording track of the disk medium. If this state occurs, data cannot be correctly recorded in a predetermined position. Moreover, there may occur a situation in which data is recorded in a track different from a desired track.

Recording inadequate states include further a PLL locking error. In a DVD, by making the grooves of a data-recording track meander at a constant frequency, a wobble signal can be extracted. A recording clock is created from this wobble signal by using the PLL, thereby enabling data to be recorded in synchrony with the disk. However, if a PLL locking error is made for any reason, there occurs a situation in which data cannot be recorded in synchrony with the disk rotation. Moreover, recording inadequate states include further a state in which the recording speed on the disk medium is higher than encoding speed of recording data or a state in which data from a higher host is not transferred in time. If such states occur, recording data is not provided in time, thereby recording irrelevant data if nothing is done. If recording is continued in a recording inadequate state, recording need be suspended immediately to avoid the situation that reproduction from the disk is impossible.

Turning back to FIG. 1, the recording-inadequate-state detecting section 2 monitors whether or not tracking error in a servo tracking occurs, whether or not a synchronization failure in a recording-clock generating PLL occurs, and whether or not a state in which recording data is not created in time for recording occurs, to thereby detect the occurrence of a recording inadequate state. If a tracking error in a servo tracking occurs, a synchronization failure in a recording-clock generating PLL occurs, or a state in which recording data is not created in time for recording occurs, the recording-inadequate-state detecting section 2 notifies the recording suspending section 3 of the occurrence of a recording inadequate state. Receiving the notification that a recording inadequate state has occurred, the recording suspending section 3 instructs the recording gate/recording data creating section 5 to stop outputting recording gate and recording data to thereby suspend the recording.

After having suspended the recording due to the occurrence of a recording inadequate state, the data recording/reproducing section 6 reads recorded data from the disk medium and identifies a write-suspended position according to an instruction from the reproducing instructing section 7, and adds data. The SYNC detection section 9 inputs reproduced data and detects SYNC frames from the reproduced data. The PI-code processing section 10 creates PI-error-correction unit data from the SYNC frames detected by the SYNC detection section 9. The PI-error-correction section 11 performs a PI-error-correction (inner-code-error-correction) of the PI-error-correction unit data created by the PI-code processing section 10. Moreover, the PO-error-correction section 12 performs a PO-error-correction (outer-code-error-correction).

The reproduction-data-rule determining section 8 inputs reproduced data and determines whether or not the data is recorded on the disk medium according to a predetermined recording rule. The recording-suspended-position determining section 13 identifies a write-suspended position by a PI-error-correction unit based on the error correction result of the PI-error-correction processing section 11. Moreover, the recording-suspended-position determining section 13 identifies a write-suspended position by a unit smaller than a PI-error-correction unit based on the determination result of the reproduction-data-rule determining section 8. The recording restart section 4 inputs information concerning the write-suspended position from the recording-suspended-position determining section 13 to instruct the recording gate/recording data creating section 5 and the data recording/reproducing section 6 to restart recording. The ECC-block-recording determining section 14 determines whether or not recording is correctly performed for the ECC block in block-by-block basis based on the PI-error-correction result and the PO-error-correction result.

Figure 3:
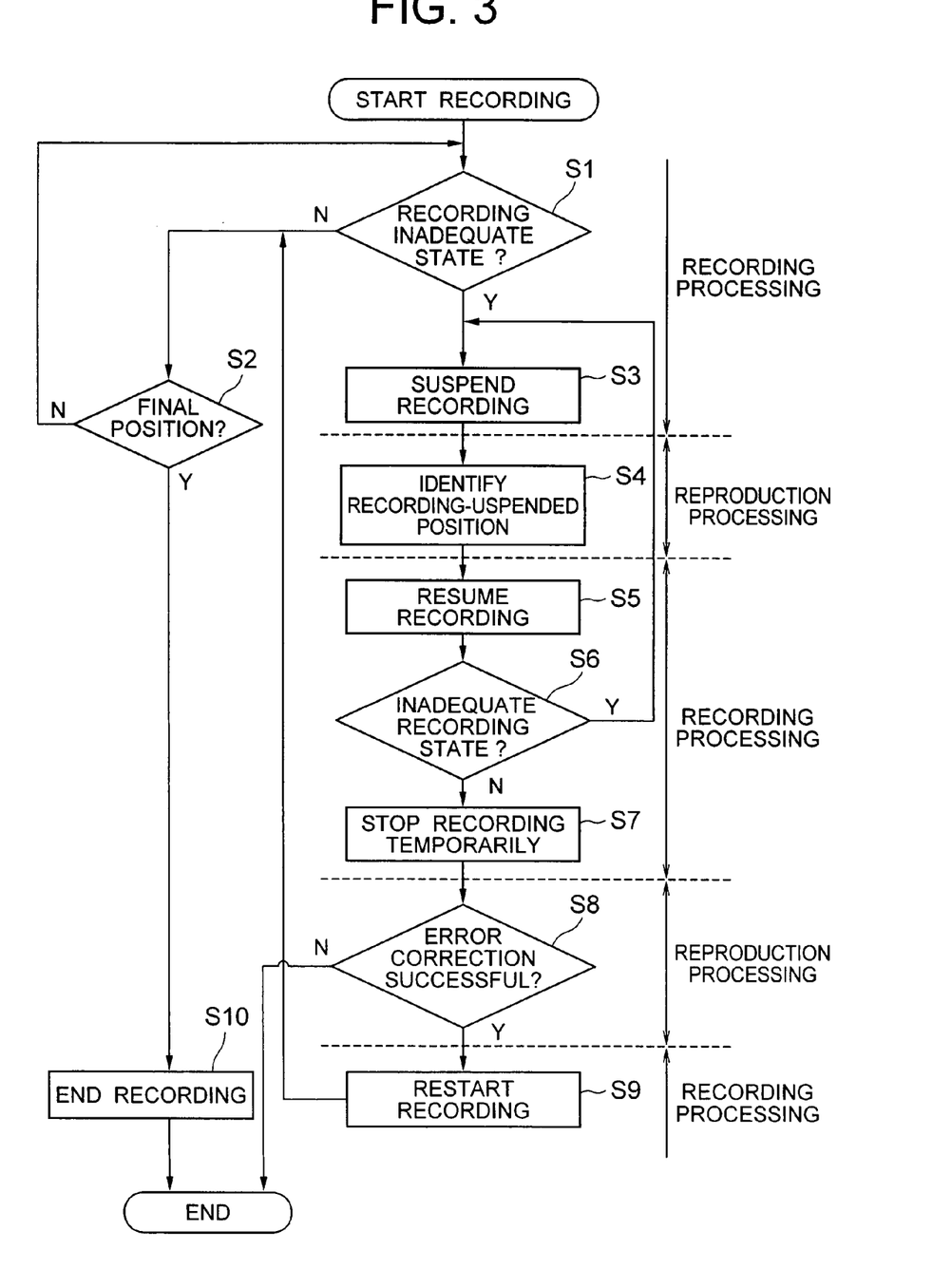
FIG. 3 is a flowchart showing operating procedures of the disk recording/reproducing apparatus.
Figure 4:
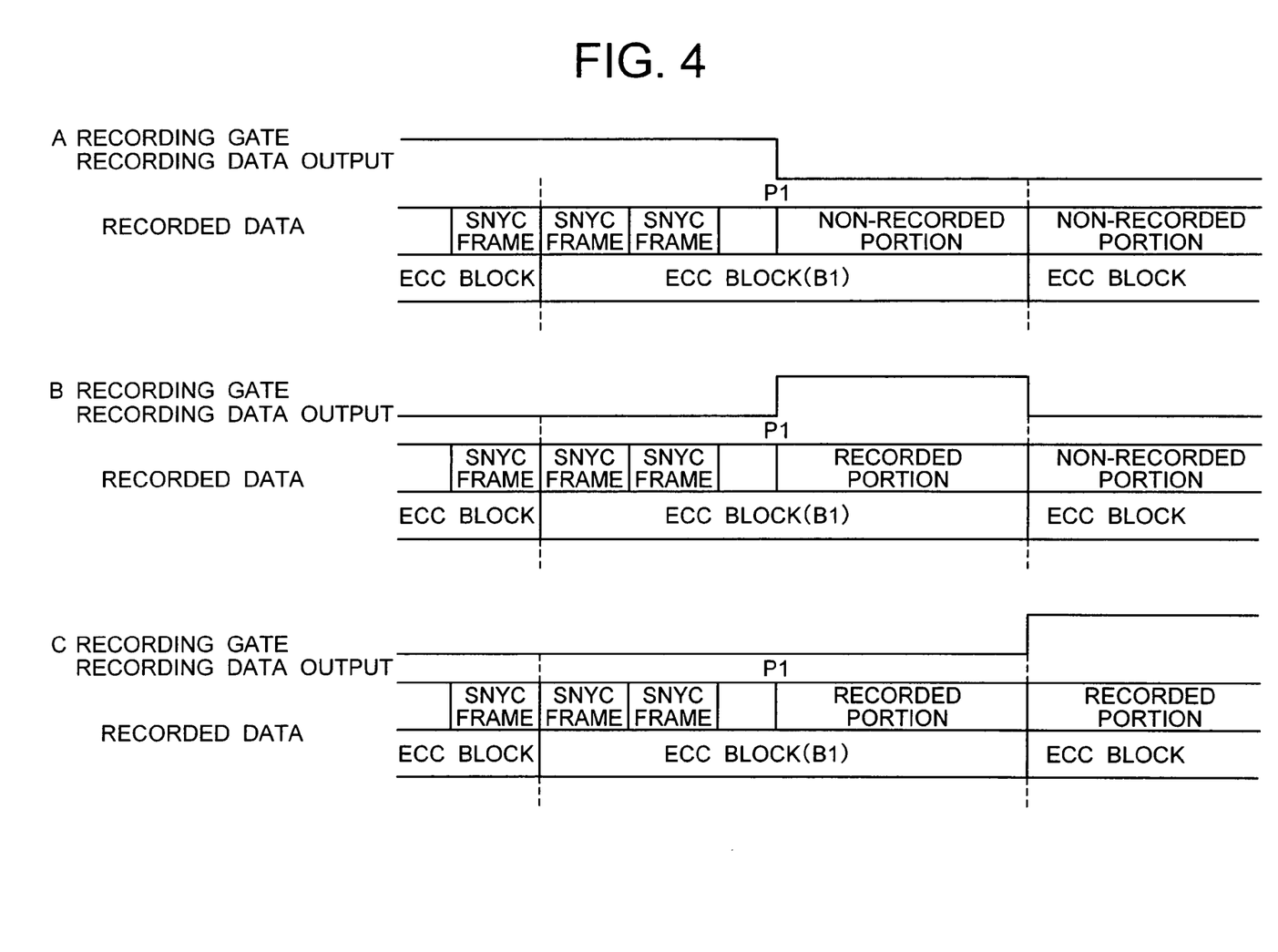
FIG. 4A is a timing chart showing the relationship between signals and recording conditions when a recording suspension is instructed.
FIG. 4B is a timing chart showing the relationship between signals and recording conditions when the writing is continued.
FIG. 4C is a timing chart showing the relationship between signals and recording conditions when the recording is further performed after the continued write operation.

FIG. 3 is a flowchart showing operating procedures of the disk recording/reproducing apparatus 100. FIGS. 4A to 4C are timing charts and data diagrams showing recording data and recording gates when recording suspension, write continuation and recording continuation are performed if recording suspension occurs. Now, there will be described in greater detail the operation of the disk recording/operating apparatus 100 when starting recording on a disk medium, suspending write and restarting write. When recording on the disk medium is started according to a recording starting instruction from the recording starting section 1, the recording-inadequate-state detecting section 2 determines whether or not a recording inadequate state has occurred (Step S1). If no recording inadequate state has occurred, it is determined whether or not a recording final position has been reached (Step S2). If the recording final position has not been reached, recording is continued. If the recording final position has been reached, a recording end processing is performed (Step S10) to end the operation.

When the occurrence of a recording inadequate state is detected by the recording-inadequate-state detecting section 2 in Step S1, the recording suspending section 3 instructs the recording gate/recording data creating section 5 to stop outputting recording gates and recording data thereby to suspend recording (Step S3). For example, as shown in FIG. 4A, a recording inadequate state is detected in a write position P1, and write is suspended in that position. When recording is suspended in the track of the ECC block as described above, a recorded portion and a non-recorded portion exist together in that ECC block. The data recording/reproducing section 6 reproduces a write-suspended disk medium, and the recording-suspended-position determining section 13 identifies a write-suspended position based on the reproduced data to comprehend to what extent recording has been performed (Step S4). Since an approximate recording-suspended position is known at this time, a head is moved short thereof to check recorded data contents.

In Step S4, first, a SYNC signal added to each 91 bytes is detected by the SYNC detecting section 9. The SYNC signal has a particular pattern which is not present in the recording data and can be detected based on the pattern. Then, 182-byte PI unit data is created by the PI-code processing section 10, and PI-error-correction is performed on the 182-byte data by the PI-error-correction processing section 11. Usually, the error correction for the recorded portion is determined impossible by the PI-error-correction. However, in a halfway recording-suspended line and the subsequent lines, there is no recording data, and thus, code words are not created, whereby the PI correction results in a correction-impossible situation. The recording-suspended-position determining section 13 determines to which line the recording has been performed based on the PI correction result.

In the recording data, the upper limit of the continuous number of '0' or '1' is determined as a recording rule so that '0' or '1' may not be recorded in succession. For example, for a DVD, the upper limit of the continuous number is 11 in a data section and 14 in a SYNC signal section. In an area succeeding to the recording-suspended position, no data is recorded. Thus, for example, a state of '0' is detected in a larger number of times than the upper limit. By detecting a recording state violating the recording rule, it can be determined to what position (what number of bytes) data has been recorded. If the reproduction-data-rule determining section 8 determines that recording which violates the recording rule has been performed, the recording-suspended-position determining section 13 identifies the write-suspended position based on the determination result. In Step S4, the reproduction-data-rule determining section 8 identifies the write-suspended position by using the determination result of the reproduced data instead of or in addition to the identification of the write-suspended position (write-suspended line) using the above PI correction result.

The recording restart section 4 instructs the recording gate/recording data creating section 5 to create remaining recording gates and recording data succeeding to the write-suspended position identified in Step S4 to restart recording by the data recording/reproducing section 6 (Step S5). The recording suspending section 3 determines whether or not a recording inadequate state has been detected by the recording-inadequate-state detecting section 2 (Step S6). In Step S6, if a recording inadequate state has been detected, the disk recording/reproducing apparatus 100 returns to Step S3 to suspend recording again and to identify a write-suspended position.

The disk recording/reproducing apparatus 100 records data up to the end of the ECC block including the write-suspended position by the recording restarted in Step S5 and temporarily ends the recording (Step S7). If the write is suspended, for example, at the position P1 shown in FIG. 4A, data is recorded, as shown in FIG. 4B, up to the end of the ECC block B1 including the write-suspended position P1 after restarting the recording. If data is recorded up to the end of the ECC block, the PI-error-correction processing section 11 performs a PI-error-correction and the PO-error-correction processing section 12 performs a PO-error-correction. The ECC-block-recording determining section 14 determines whether or not the error correction for the ECC block including the write-suspended position is possible based on the above error correction result (Step S8) and determines whether or not write continuation has been performed correctly.

In the ECC block in which the write continuation from the write-suspended position has been performed, there is a possibility that the write continuation has not been correctly performed on the disk medium based on the recording clock. Moreover, there is a possibility that some overwrite occurs or some non-recorded portion is present, resulting in a possibility of a reproduction PLL failure. In such a case, an error cannot be completely corrected by the PI-error-correction, and it can be determined that the error correction is determined impossible by the PI-error-correction. However, even in that case, if the portion which cannot be corrected by the PI-error-correction can be corrected by the PO-error-correction, recording data can be reproduced and it can be determined that recording has been normally performed.

The ECC-block-recording determining section 14 determines that write continuation has been correctly performed if it is determined in Step S8 that the error correction is determined possible by the PO-error-correction result, and determines that the write continuation has not been correctly performed if it is determined in Step S8 that the error correction is determined impossible by the PO-error-correction result. An unstable PLL or a reproduction processing response to a frame period fluctuation may be considered to be responsible for an incorrectly performed write continuation. The disk medium determined non-correctable by the PO-error-correction is a non-reproducible disk medium on which the write continuation is of no use. Thus, if it is determined in Step S8 that the error correction is determined impossible by the PO-error-correction, it is determined that the recording on the disk medium has failed at that time and the recording processing by the data recording/reproducing apparatus 100 is ended.

If the ECC-block-recording determining section 14 determines that the write continuation has been correctly performed, the recording restart section 4 instructs the recording gate/recording data creating section 5 to output the recording gates and recording data of the ECC blocks succeeding to the recorded ECC block to restart recording (Step S9). Thereafter, the process advances to Step S2, wherein it is determined whether or not the final recording position has been reached, and the recording is continued until the final recording position is reached while monitoring whether or not a recording inadequate state has occurred in Step S1. If a suspension, shown in FIG. 4A for example, occurs, write continuation of the ECC block B1 shown in FIG. 4B is performed, and it is determined in Step S8 that the relevant ECC block B1 has been correctly recorded in a reproducible state, the recording gates and recording data of the ECC blocks succeeding to the EEC block B1 are output from the recording gate/recording data creating section 5, as shown in FIG. 4C, to record the remaining data.

In the present embodiment, it is determined whether or not the error correction by the PI-error-correction is possible and/or whether or not recording according to the recording rule has been performed by reproducing a recording-suspended disk medium, to thereby identify the write-suspended position. Therefore, even if some errors are included in the reproduced data, the write-suspended position can be correctly identified. Thereby, a situation in which data is recorded in duplicate or a data-non-recorded portion is present can be avoided when the recording is restarted in the identified write-suspended position. Moreover, by identifying the write-suspended position depending on both whether or not the error correction by the PI-error-correction is determined possible and whether or not the recording has been performed according to the recording rule, the write-suspended position can be identified more assuredly.

In the present embodiment, the restarted recording is temporarily ended at the end of the write-suspended ECC block, the relevant ECC block is reproduced to perform the PI-error-correction and the PO-error-correction, and it is determined whether or not the write continuation is successful based on the error correction result. The disk recording/reproducing apparatus 100 restarts recording on the subsequent ECC blocks again if it is determined that the write continuation is successful. On the other hand, the disk recording/reproducing apparatus 100 performs no recording on the subsequent ECC blocks, to thereby end the processing if it is determined that the write continuation is unsuccessful. In this manner, there can be avoided an undesired situation in which the write-suspended ECC block proves to non-reproducible data after all the data has been recorded by restarting recording.

Further, in the above embodiment, there has been described the case in which the write-once disk is used as a disk medium. However, the write-suspended position may be identified for a rewritable disk by operations similar to those described above to thereby add data to the area starting from the write-suspended position. Moreover, there has been described an example in which the recording is temporarily suspended at the end of the write-suspended ECC block and the relevant ECC block is reproduced to determine whether or not the write continuation is successful. However, this processing is not necessarily essential, and by returning from Step S5 (FIG. 3) to Step S2, recording from the relevant ECC block to the final recording position may be performed continuously.

If the write-suspended position is identified by the PI-error-correction result, the line where the writing has been suspended can be identified; however, the write-suspended position itself in the line cannot be identified. In this case, the recording restart section 4 can restart the recording at the start of the write-suspended line or at the start of a line succeeding to the write-suspended line. In this case, some overwritten portion occurs when the recording is restarted at the start of the write-suspended line, and some non-recorded portion occurs when the recording is restarted at the start of a line succeeding to the write-suspended line. However, this affects at most a single line and is substantially out of the question for recording and reproducing. Moreover, recording can be restarted in a predetermined position of the write-suspended line, for example, in the center thereof. In this case, the overwritten portion or the non-recorded portion can be at most equal to a half line.

The present invention has been described in accordance with a preferred embodiment thereof. However, the disk recording/reproducing apparatus and the disk recording method are not limited only to the above embodiment, and various modifications and changes from the above embodiment are also included within the scope of the present invention.

The invention claimed is:

1. A disk recording/reproducing apparatus which includes a data recording section for recording data on a disk medium and a data reproducing section for reproducing data from the disk medium, comprising:

recording suspending means for monitoring whether or not a recording inadequate state occurs, to suspend recording by the data recording section if the recording inadequate state occurs;

reproducing instructing means for instructing the data reproducing section to reproduce data from a disk medium on which the recording is suspended;

suspended-position estimating means for estimating a recording-suspended position by examining whether or not an inner-code-error-correction is possible for data reproduced from the recording-suspended disk medium by the data reproducing section, the suspended position estimating means identifying a write-suspended position by a unit smaller than inner-code-error-correction; and recording restart means for restarting recording by the data recording section from a recording restart position determined based on the estimated recording-suspended position.

2. The disk recording/reproducing apparatus according to claim 1, wherein if at least one of a tracking failure in servo tracking, a synchronization failure in a recording-clock generating PLL and a delay of recording data supplied to the data recording section occurs, the recording suspending means suspends the recording by the data recording section.

3. The disk recording/reproducing apparatus according to claim 1, wherein the suspended-position estimating means has an error-correction-result determining means for estimating that the recording-suspended position is present in a recording block of an inner-code-error-correction-code word unit for which the inner-code-error-correction is determined impossible.

4. The disk recording/reproducing apparatus according to claim 3, wherein the recording restart means determines the recording restart position at the start of the recording block of the inner-code-error-correction-code word unit for which the inner-code-error-correction is determined impossible by the error-correction-result determining means.

5. The disk recording/reproducing apparatus according to claim 3, wherein the recording restart means determines the recording restart position at the start of a recording block succeeding to the recording block of the inner-code-error-correction-code word unit for which the inner-code-error-correction is determined impossible by the error-correction-result determining means.

6. The disk recording/reproducing apparatus according to claim 3, wherein the recording restart means determines the recording restart position at a predetermined position in the recording block of the inner-code-error-correction-code word unit for which the inner-code-error-correction is determined impossible by the error-correction-result determining means.

7. The disk recording/reproducing apparatus according to claim 3, wherein the suspended-position estimating means further includes a reproduction-data-rule-violation detecting means which determines whether or not the reproduced data violates a predetermined reproduction data rule, to detect a code position violating the reproduction data rule, and the suspended-position estimating means estimates the recording-suspended position based on the code position violating the reproduction data rule in addition to determining whether or not the inner-code-error-correction is possible.

8. The disk recording/reproducing apparatus according to claim 1, wherein the recording restart means instructs the data recording section to stop recording at an end of an error-correction-code (ECC) block including the estimated recording-suspended position after having restarted recording, the error-correction-result determining means determines whether or not the error correction for the reproduced data in the ECC block reproduced by the data reproducing section according to the instruction of the reproduction instructing means is possible, and the recording restart section restarts recording in an ECC block succeeding to the ECC block including the estimated recording-suspended position if the error correction is determined possible.

9. The disk recording/reproducing apparatus according to claim 8, wherein the recording restart means stops recording if the error-correction-result determining means determines that the error correction for the ECC block including the estimated recording-suspended position is impossible.

10. A disk recording/reproducing apparatus which includes a data recording section for recording data on a disk medium and a data reproducing section for reproducing data from the disk medium, comprising:
  recording suspending means for monitoring whether or not a recording inadequate state occurs, to suspend recording by the data recording section if the recording inadequate state occurs;
  reproducing instructing means for instructing the data reproducing section to reproduce data from a recording-suspended disk medium;
  suspended-position estimating means for estimating a recording-suspended position by examining whether or not data reproduced from the recording-suspended disk medium by the data reproducing means violates a predetermined reproduction data rule by exceeding an upper limit of a same data; and
  recording restart means for restarting the recording by the data recording section from a recording restart position determined based on the estimated recording-suspended position.

11. A disk recording/reproducing apparatus which includes a data recording section for recording data on a disk medium and a data reproducing section for reproducing data from the disk medium, comprising:
  recording suspending means, reproducing instructing means, recording-suspended-position estimating means, error-correction-result determining means and recording restart means, wherein:
  the recording suspending means monitors whether or not a recording inadequate state occurs, to suspend recording by the data recording section if the recording inadequate state occurs;
  the reproducing instructing means instructs the data reproducing section to reproduce data from a disk medium on which the recording is suspended;
  the suspended-position estimating means estimates a recording-suspended position based on data reproduced from the recording-suspended disk medium by the data recording section;
  the recording restart means restarts recording by the data recording section and instructs the data recording section to record data from the recording restart position determined based on the estimated recording-suspended position to an end of an error-correction-code (ECC) block including the estimated recording-suspended position, the suspended position estimating means identifying a write-suspended position by a unit smaller than the error-correction-code block;
  the reproducing instructing means instructs the data reproducing section to reproduce the ECC block recorded by the data recording section according to the instruction of the recording restart section;
  the error-correction-result determining means determines whether or not an error correction for the data reproduced by the data reproducing section is possible; and
  the recording restart means instructs the data recording section to restart recording of an error-correction-code (ECC) block succeeding to the ECC block including the estimated recording-suspended position if the error correction is determined possible by the error-correction-result determining means.

12. The disk recording/reproducing apparatus according to claim 11, wherein the recording restart means stops recording if the error-correction-result determining means determines that the error correction is impossible.

13. A disk recording method using a disk recording/reproducing apparatus which includes a data recording section for recording data on a disk medium and a data reproducing section for reproducing data from the disk medium, comprising:
  monitoring whether or not a recording inadequate state occurs, to suspend recording by the data recording section if the recording inadequate state occurs;
  instructing the data reproducing section to reproduce data from a disk medium on which the recording is suspended;
  estimating a recording-suspended position by examining whether or not an inner-code-error-correction is determined possible for the reproduced data based on the reproduced data reproduced by the data reproducing section, the suspended position being identified by a write-suspended position by a unit smaller than the inner-code-error-correction; and
  restarting recording by the data recording section from a recording restart position determined based on the estimated recording-suspended position.

14. The disk recording method according to claim 13, wherein if at least one of a tracking failure in servo tracking, a synchronization failure in a recording-clock generating PLL and a delay of recording data supplied to the data recording section occurs, the suspending of recording suspends the recording.

15. The disk recording method according to claim 13, wherein the estimating of suspended position estimates that the recording-suspended position is present in a recording block
  of an inner-code-error-correction-code word unit for which the inner-code-error-correction is determined impossible.

16. The disk recording method according to claim 15, wherein the restarting of recording determines the recording restart position at a start of a recording block of the inner-code-error-correction-code word unit for which the inner-code-error-correction is determined impossible.

17. The disk recording method according to claim 15, wherein the restarting of recording determines the recording restart position at a start of a recording block succeeding to the recording block of the inner-code-error-correction-code word unit for which the inner-code-error-correction is determined impossible.

18. The disk recording method according to claim 15, wherein the restarting of recording determines the recording restart position at a predetermined position in the recording block of the inner-code-error-correction-code word unit for which the inner-code-error-correction is determined impossible.

19. The disk recording method according to claim 15, wherein the estimating of the suspended position further determines whether or not the reproduced data violates a predetermined reproduction data rule to detect a code position violating the reproduction data rule, and estimates the recording-suspended position based on the code position violating the reproduction data rule in addition to determining whether or not the inner-code-error-correction is possible.

20. The disk recording method to claim 13, wherein the restarting of recording temporarily stops the restarted recording at an end of the ECC block including the estimated recording-suspended position and restarts recording in an ECC block succeeding to the ECC block including the estimated recording-suspended position if the error correction is determined possible.

21. The disk recording method according to claim 20, wherein the restarting of recording stops the recording if an error correction for the ECC block including the estimated recording-suspended position is determined impossible.

22. A disk recording method in a disk recording/reproducing apparatus which includes a data recording section for recording data on a disk medium and a data reproducing section for reproducing data from the disk medium, comprising:
   monitoring whether or not a recording inadequate state occurs, to suspend recording by the data recording section if the recording inadequate state occurs;
   creating reproduced data by reproducing data from a disk medium on which the recording is suspended;
   estimating a recording-suspended position by examining whether or not the reproducing data violates a predetermined reproduction data rule by exceeding an upper limit of a same data; and
   restarting the recording from a recording restart position determined based on the estimated recording-suspended position.

23. A disk recording method in a disk recording/reproducing apparatus which includes a data recording section for recording data on a disk medium and a data reproducing section for reproducing data from the disk medium, the method comprising:
   monitoring whether or not a recording inadequate state occurs, to suspend recording if the recording inadequate state occurs;
   reproducing data from the disk medium on which recording has been suspended in the suspending of recording;
   estimating a recording-suspended position based on data reproduced from the recording-suspended disk medium;
   recording data from a recording restart position determined based on the estimated recording-suspended position to an end of an ECC block including the estimated recording-suspended position;
   reproducing the ECC block including the estimated recording-suspended position;
   determining whether or not an error correction for the reproduced data reproduced from the ECC block including the estimated recording-suspended position is possible and identifying a write-suspended position by a unit smaller than the error correction; and
   restarting recording from a ECC block succeeding to the ECC block including the estimated recording-suspended position if the error correction is determined possible in the determining.

24. The disk recording method according to claim 23, further comprising stopping the reproducing if the error correction for the ECC block including the recording-suspended position is determined impossible in the determining.

* * * * *